(12) United States Patent
Nitsch et al.

(10) Patent No.: US 11,608,203 B2
(45) Date of Patent: Mar. 21, 2023

(54) DEVICE FOR PRODUCING MULTIPACKS

(71) Applicant: KHS GmbH, Dortmund (DE)

(72) Inventors: Thomas Nitsch, Kleve (DE); Thomas Stienen, Unna (DE)

(73) Assignee: KHS GmbH, Dortmund (DE)

( * ) Notice: Subject to any disclaimer, the term of this patent is extended or adjusted under 35 U.S.C. 154(b) by 249 days.

(21) Appl. No.: 17/042,341

(22) PCT Filed: Apr. 24, 2019

(86) PCT No.: PCT/EP2019/060413
§ 371 (c)(1),
(2) Date: Sep. 28, 2020

(87) PCT Pub. No.: WO2019/206928
PCT Pub. Date: Oct. 31, 2019

(65) Prior Publication Data
US 2021/0009292 A1    Jan. 14, 2021

(30) Foreign Application Priority Data

Apr. 24, 2018  (DE) .......................... 102018109770.0

(51) Int. Cl.
*B65B 17/02*     (2006.01)
*B65B 21/06*     (2006.01)
(Continued)

(52) U.S. Cl.
CPC .............. *B65B 17/02* (2013.01); *B65B 21/06* (2013.01); *B65D 21/0205* (2013.01); *B65G 21/2072* (2013.01); *B65G 2201/0244* (2013.01)

(58) Field of Classification Search
CPC ......... B65B 17/02; B65B 21/06; B65B 35/36; B65B 63/02; B65D 21/0205; B65G 21/2072; B65G 2201/0244; B65G 47/088
See application file for complete search history.

(56) References Cited

U.S. PATENT DOCUMENTS 3,987,889 A * 10/1976 Godoy ................... B65G 47/82
                                                          198/747
4,078,357 A *  3/1978 Ida .......................... B65B 17/02
                                                           53/448

(Continued)

FOREIGN PATENT DOCUMENTS

DE    102012100810 A1    6/2013
DE    102013110048 A1    3/2015
(Continued)

*Primary Examiner* — Andrew M Tecco
*Assistant Examiner* — Nicholas E Igbokwe
(74) *Attorney, Agent, or Firm* — Occhiuti & Rohlicek LLP

(57) ABSTRACT

An apparatus for producing a multipack includes forming groups on opposite sides of a transport section. The first forming group comprises a sliding carriage that moves along and transverse to a transport direction, a format part that forms a contact surface for engaging a container, and a guiding-and-holding element that detachably secures the format part to the sliding carriage. The first and second forming groups are movable along the transport direction and transverse to the transport direction such that contact surfaces of the first and second forming groups that are opposite each other are brought into contact with containers to move the containers along the transport direction and to press the containers against each other by moving transverse to the transport direction.

18 Claims, 6 Drawing Sheets

(51) Int. Cl.
  *B65D 21/02* (2006.01)
  *B65G 21/20* (2006.01)

(56) References Cited

U.S. PATENT DOCUMENTS

| | | |
|---|---|---|
| 2004/0112714 A1 | 6/2004 | Davaillon |
| 2015/0191263 A1* | 7/2015 | Nitsch .................... B65G 29/00 |
| | | 156/556 |
| 2016/0207650 A1* | 7/2016 | Kamps .................... B65B 17/02 |
| 2016/0207651 A1* | 7/2016 | Cattaneo ............... B65B 11/008 |
| 2016/0221765 A1* | 8/2016 | Joehren ................ B65G 47/846 |
| 2016/0222998 A1* | 8/2016 | Krulitsch ........... B65G 21/2072 |

FOREIGN PATENT DOCUMENTS

| | | |
|---|---|---|
| DE | 102014101722 A1 | 8/2015 |
| ES | 2615539 A1 | 6/2017 |
| FR | 2975081 A1 | 11/2012 |
| WO | 2011092723 A1 | 8/2011 |
| WO | 2015/028362 A1 | 3/2015 |
| WO | 2015036185 A1 | 3/2015 |

* cited by examiner

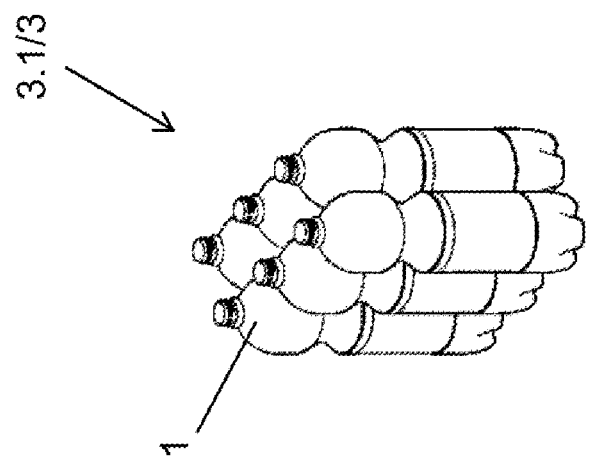
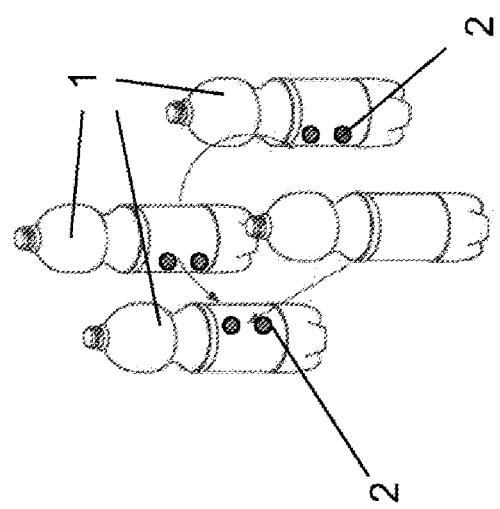
Fig. 1

DEVICE FOR PRODUCING MULTIPACKS

RELATED APPLICATIONS

This is the national stage of PCT application PCT/EP2019/060413, filed on Apr. 24, 2019, which claims the benefit of the Apr. 24, 2018 priority date of German application DE 102018109770.0, the content of which is herein incorporated by reference.

FIELD OF INVENTION

The invention relates to a device for producing multipacks.

BACKGROUND

It is known to produce multipacks in which containers are joined to each other by adhesive. This eliminates the need for additional packaging materials.

Devices for producing such multipacks preferably can accommodate many different container types with different sizes. It is therefore useful to be able to easily adjust these devices to accommodate different sizes and container formats.

SUMMARY

An object of the present invention is that of providing a device for the production of multipacks that can be adjusted to accommodate containers of different formats with different diameters in a simple way. a simple and uncomplicated change of format between different container types with different container outer diameters.

According to a first aspect, the invention relates to a device for producing multipacks from container groups, which in each case comprise at least one container in at least two rows. In this situation, the device comprises a container inlet, to which the containers are conveyed in at least one two-track container flow, as well as, in each case, a treatment segment for each container stream, on which the containers are in each case provided with adhesive applications of a glue, preferably of a contact adhesive. The device further comprises a transport section, arranged downstream of the at least two treatment segments, wherein at least one forming device is provided at the transport section, for separating the container groups from the container flow and/or for compressing the container groups, with the containers of each container group being connected at the adhesive application points to form a multipack.

The forming device in turn comprises in each case at least one first and one second forming group, in pairs on sides of the transport section extending in the transport direction and essentially opposite one another. In this situation, the first and second forming groups in each case comprise at least one sliding carriage, movable along and/or transverse to the transport direction, as well as, in each case, at least one format part, detachably secured to the corresponding sliding carriage by means of at least one guiding and holding element.

Formed at the format parts is in each case at least one container contact surface, for receiving and/or separating and/or compressing a container of a container group, which is put into effect by the at least one container contact surface of the format parts, arranged opposite one another in pairs, of the first and second forming groups, being brought in contact with a respective container outer casing surface of a corresponding container of a container group, and being moved at least in the transport direction and/or the containers are pressed against one another transverse to the transport direction.

Over the length of the at least one guiding element of the respective first and/or second forming group, it is particularly easy in this situation to adjust the relative distance interval between the sliding carriages concerned, and the container contact surface formed at the corresponding format part, and therefore for adjustment to be made to match a corresponding container outer diameter. In particular, at a format change to another container type or container size, it is also now no longer necessary, as it was in the prior art, for the sliding carriages to be replaced completely; instead, they can remain in their guide tracks. The time required, and therefore also the costs, for re-equipping from one container type to another container type are therefore substantially reduced.

According to another embodiment, provision can be made the respective format part, comprising at least one guiding and holding element, to be configured as a completely exchangeable structural unit, which in each case is arranged directly on the associated sliding carriage, secured mechanically but detachably by means of the at least one guiding and holding element.

According to a further embodiment, provision can be made for the guiding and holding elements to be configured as rod-shaped or strip-shaped, preferably as a U-profile.

According to another embodiment, provision can be made for the respective sliding carriage to comprise at least one support body, configured as a U-shape, which is formed from a central middle limb, and also from an upper side limb and a lower side limb, which in each case extend preferably at right angles on the free face sides away from the central middle limb.

According to another embodiment, provision can be made for the corresponding format part to comprise at least one upper and one lower guiding and holding element, wherein the upper guiding and holding element is detachably secured to the upper side limb of a corresponding support body, and the lower guiding and holding element is detachably secured to the lower side limb of the same support body of the at least one first and/or second sliding carriage.

According to another embodiment, provision can be made for the upper and/or lower guiding and holding element to be connected in the region of their respective free face sides, in each case by means of a detachable quick-connection device, to the corresponding support body of a first and/or second sliding carriage, mechanically securely but detachably.

According to another embodiment, provision can be made for the respective upper and lower guiding and holding elements to be connected to one another on the respective side facing towards the container contact surface, mechanically securely, in each case by means of a strip-shaped head piece.

According to another embodiment, provision can be made for at least one container receiver to be arranged at the respective strip-shaped head piece, on the side facing away from the corresponding guiding and holding element, formed on which is the at least one container contact surface.

According to another embodiment, provision can be made for the respective format part to comprise an upper container receiver and a lower container receiver, along the respective head piece and spaced at a distance from it, wherein an upper container contact surface is formed at the upper container receiver, and a lower container contact surface is formed at the lower container receiver.

According to another embodiment, provision can be made that, by means of a change in the longitudinal extension of the respective upper and/or lower guiding and holding elements, the relative distance interval of the first forming group from the second forming group is adjustable transverse to the transport direction, and can be adjusted to the different container types, in particular to their container outer diameters.

According to another embodiment, provision can be made for the respective first and second forming group in each case to comprise in each case several sliding carriages, and, in each case detachably secured to them, several format parts.

According to another embodiment, provision can be made for the individual format parts of each first and/or second forming group to be mechanically coupled to one another by guide rods.

According to another embodiment, provision can be made for the first and/or second forming group, formed from several format parts, to be configured as a completely exchangeable structural unit by means of the respective mechanical coupling of the related upper and/or lower guide rods.

According to another embodiment, provision can be made that, by means of a change in the respective longitudinal extension of the corresponding guide rods, the lateral distance interval between the individual format parts of a corresponding first and/or second forming group, and therefore the force is adjustable which takes effect on the individual containers of a container group, in and/or against the transport direction, by means of the container contact surfaces.

According to another embodiment, provision can be made for the corresponding first and/or second forming group to comprise guide rods with an identical or approximately identical length, as well as identical or approximately identical container contact surfaces.

According to another embodiment, provision can be made for the individual format parts of a first and/or second forming group to be configured, inside the respective forming group, as being at least partially different from one another.

According to another embodiment, provision can be made for the corresponding first and/or second forming group to comprise, at least partially, guide rods configured with a different length to one another, and container contact surfaces configured as at least partially different from one another.

As used herein, "contact adhesive" is intended to mean an adhesive that is self-adhering and that produces an adhesive bond with a surface as a result of being pressed against a surface. Such an adhesive is also referred to as a "self-adhesive."

Expressions such as "essentially" and "approximately" are intended to indicate deviations from an exact value by ten percent and/or deviations that are of no significance for function.

Identical reference numbers are used in the Figures for elements of the invention which are the same or have the same effect. Moreover, for the sake of easier overview, only reference numbers are represented in the individual Figures which are required for the description of the respective Figure.

For the sake of completeness, attention is drawn to the fact that, within the framework of the present invention, the term "container" is to be understood to mean not only bottles but also cans, cardboard packaging, tubular bag packaging, etc.

Attention is likewise drawn to the fact that, within the framework of the present invention, the formulation "adherent applications of an adhesive" is also to be understood as the application of adhesive pads, preferably of elastically and/or plastically deformable adhesive pads, with double-sided adhesion, such as are generally known to the person skilled in the art.

Further embodiments, advantages, and possible applications of the invention are also derived from the following description of exemplary embodiments and from the Figures. In this situation, all the features described and/or pictorially represented are in principle objects of the invention, individually or in any desired combination, regardless of their summary in the claims or reference to them. The contents of the claims are also deemed to be a constituent part of the description.

BRIEF DESCRIPTION OF THE DRAWINGS

The invention is explained hereinafter in greater detail on the basis of the Figures in relation to exemplary embodiments. The Figures show:

FIG. 1 shows containers before and after being joined by adhesive to form a container pack;

DETAILED DESCRIPTION

Figure 2:
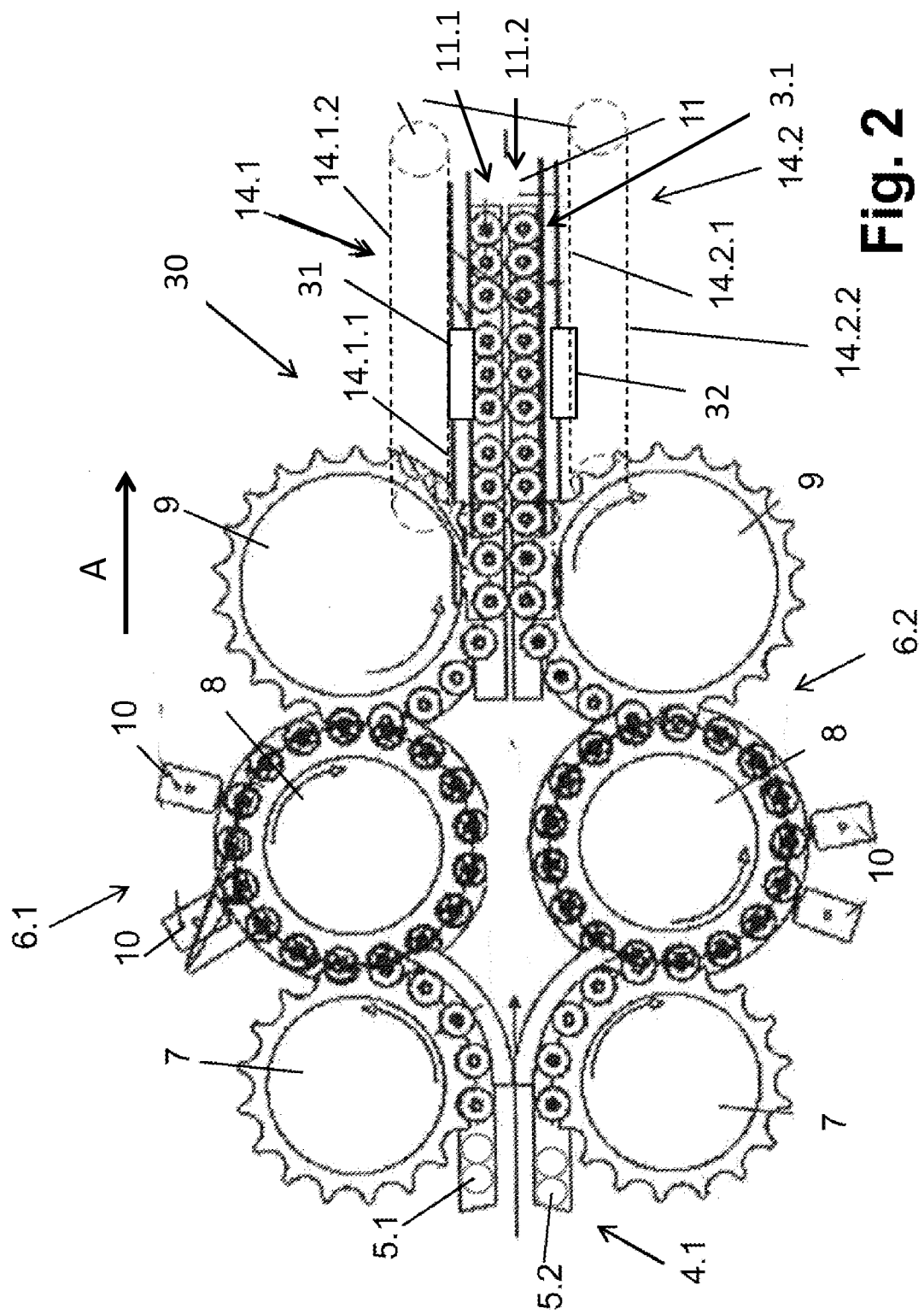
FIG. 2 is a top view of a device for producing container packs as shown in FIG. 1.

FIG. 1 shows containers 1 that are filled with a filling product and closed thereafter. The illustrated containers 1 are bottles. These bottles are typically formed by blow-molding plastic or polyethylene terephthalate. The filling product can be solid, fluid, or a mixture thereof, with fluid being either liquid or gas or both.

A combination of several containers 1 forms a container group 3.1. In the illustrated embodiment, three containers 1 form a container group 3.1. Adhesive spots 2 placed on the the containers 1 bond the containers 1 to each other and also bond container groups 3.1 to each other. Bonding two container groups 3.1 results in a multipack 3. As a result of using adhesive, the multipack 3 does not require surrounding packaging.

A device 4 that forms the multipacks 3, which is shown in FIG. 2, includes a container inlet 4.1 that receives first and second container flows 5.1, 5.2 of containers 1. The containers 1 stand upright and follow one another with a minimal gap between them as they travel in a transport direction A. Although only two container flows are shown, embodiments include those that receive more than two container flows.

The device 4 also includes first and second treatment segments 6.1, 6.2. It is at the treatment segments 6.1, 6.2 that adhesive spots 2 are applied to the correct positions on the containers 1. Containers 1 in the first container flow 5.1 proceed to the first treatment segment 6.1. Containers 1 in the second container flow 5.2 proceed to the second treatment segment 6.2.

In a preferred embodiment, the first and second treatment segments 6.1, 6.2 are identical but arranged with mirror-symmetry relative to a vertical middle plane. Each treatment segment 6.1, 6.2 includes an inlet star 7, a treatment star 8, and an outlet star 9, each of which is driven to rotate about its corresponding vertical axis and each of which includes container receivers along its periphery.

The container receivers of a treatment star 8 rotate a container 1 about its vertical container axis. This permits the adhesive spot 2 to be applied in the correct position onto the container's surface.

Each treatment segment 6.1, 6.2 also includes an application head 10 to apply the adhesive spots 2. The application heads 10 do not move with the treatment star 8. Their positions are fixed.

In some cases, several adhesive spots 2 are required. In such cases, a treatment segment 6.1, 6.2 includes several application heads 10 that follow one another along the treatment star's rotation direction.

The outlet stars 9 convey the containers 1, which have had adhesive spots 2 applied thereto, onward to a transport section 11. The containers 1 move along the transport direction A in corresponding first and second tracks 11.1, 11.2. In the illustrated embodiment, the transport direction A of the first and second tracks 11.1, 11.2 is the same as that of the first and second container flows 5.1, 5.2.

The container groups 3.1 are formed along the transport section 11 from the containers 1 on the first and second tracks 11.1, 11.2. Each row of the multipack 3 comes from a corresponding one of the first and second tracks 11.1, 11.2. In the illustrated embodiment, the multipack 3 has two rows of three containers each, for a total of six containers 1.

A forming device 30 compresses the containers 1 of a container group 3.1 along the transport direction A and also compresses container groups 3.1 against each other in a direction transverse to the transport direction A. This promotes bonding by the adhesive spots 2 to form the multipack 3.

The forming device 30 comprises first and second forming groups 31, 32 that are arranged on opposite sides of the transport section 11. In a typical embodiment, the first and second forming groups 31, 32 are identical but with mirror symmetry about a vertical middle plane that bisects the transport section 11 along the transport direction A.

Figure 5:
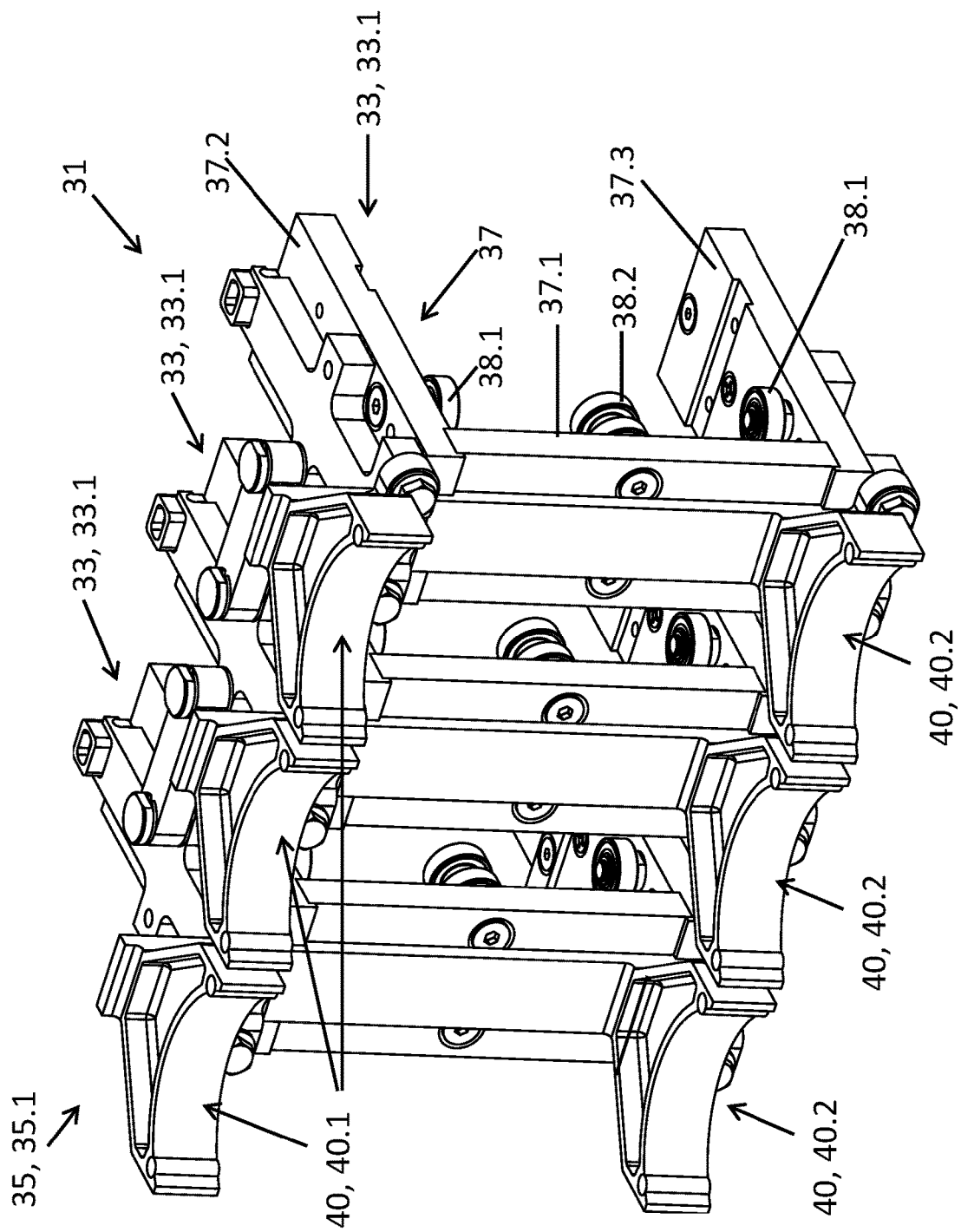
FIG. 5 is a perspective view of a sliding carriage having a format part as shown in FIG. 3 secured thereto.
Figure 6:
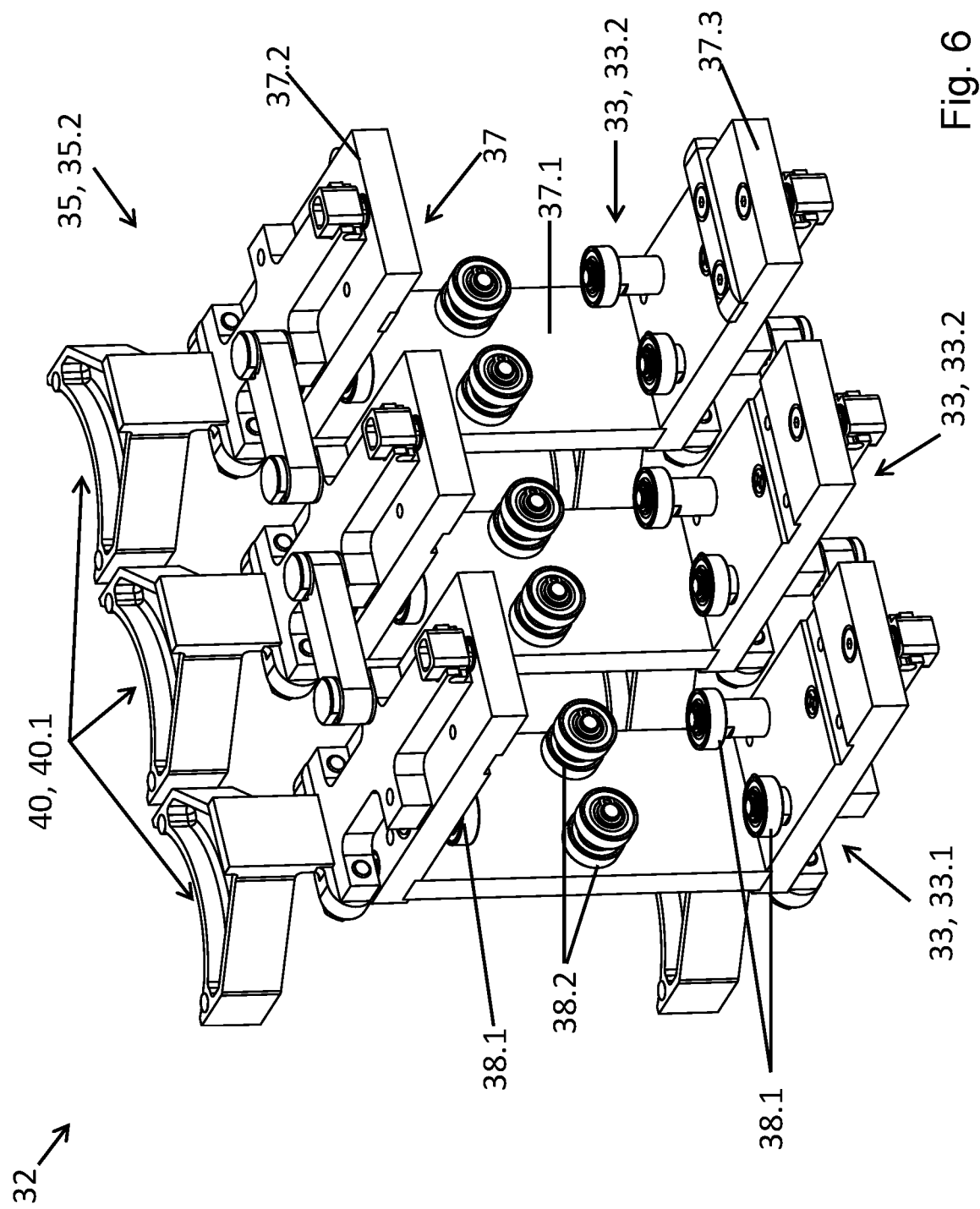
FIG. 6 is a perspective view of a sliding carriage having a format part as shown in FIG. 4 secured thereto.

Referring now to FIGS. 5 and 6, the device 4 includes a pair of sliding carriages 33. A first sliding carriage 33.1 is part of the first forming group 31 and a second sliding carriage 33.2 is part of the second forming group 34. Each of the first and second sliding carriages moves along and/or transversely to the transport direction A.

Each sliding carriage 33.1, 33.2 has carrying body 37 that carries vertical guide rollers 38.1 and horizontal guide rollers 38.2, both of which rotate relative to the carrying body 37. The vertical guide rollers 38.1, which have a vertical axis of rotation, provide vertical guidance. The horizontal guide rollers 38.2, which have a horizontal axis of rotation, provide horizontal guidance. Guide rails positively guide the horizontal and vertical guide rollers 38.1, 38.2.

The guide rails follow a path corresponding to the courses of corresponding first and second closed circulating track 14.1, 14.2, which can be seen in FIG. 2. The guide rollers 38.1, 38.2 of the first sliding carriage 33.1 are guided by the guide rails of the first circulating track 14.1. The guide rollers 38.1, 38.2 of the second sliding carriage 33.2 are guided by the guide rails of the second circulating track 14.2.

As can be best seen in FIG. 6, a preferred support body 37 has a central rear middle limb 37.1, an upper side limb 37.2, and a lower side limb 37.3. The upper side limb 37.2 and the lower side limb 37.3 extend out at right angles on the free face sides of the central middle limb 37.1 to form a "U". In some embodiments, the support body 37 is a unitary body that is formed from a single piece.

The horizontal guide rollers 38.2 are arranged at the central rear middle limb 37.1 facing towards the corresponding format part 35. The vertical guide rollers 38.1 are arranged on either the upper or the lower limb 37.2, 37.3 or both.

The vertical guide rollers 38.1 enable adjustment of the distance between the first forming group 31 and the second forming group 32 to be changed by a movement of the corresponding sliding carriage 33, 33.1, 33.2. This, in turn, permits adjustment of the force that acts on the containers 1 of a container group 3.1 transverse to the transport direction A.

The horizontal guide rollers 38.2 enable adjustment of the relative height of the respective first and second forming groups 31, 32 relative to the transport plane formed on the transport section 11.

Figure 3:
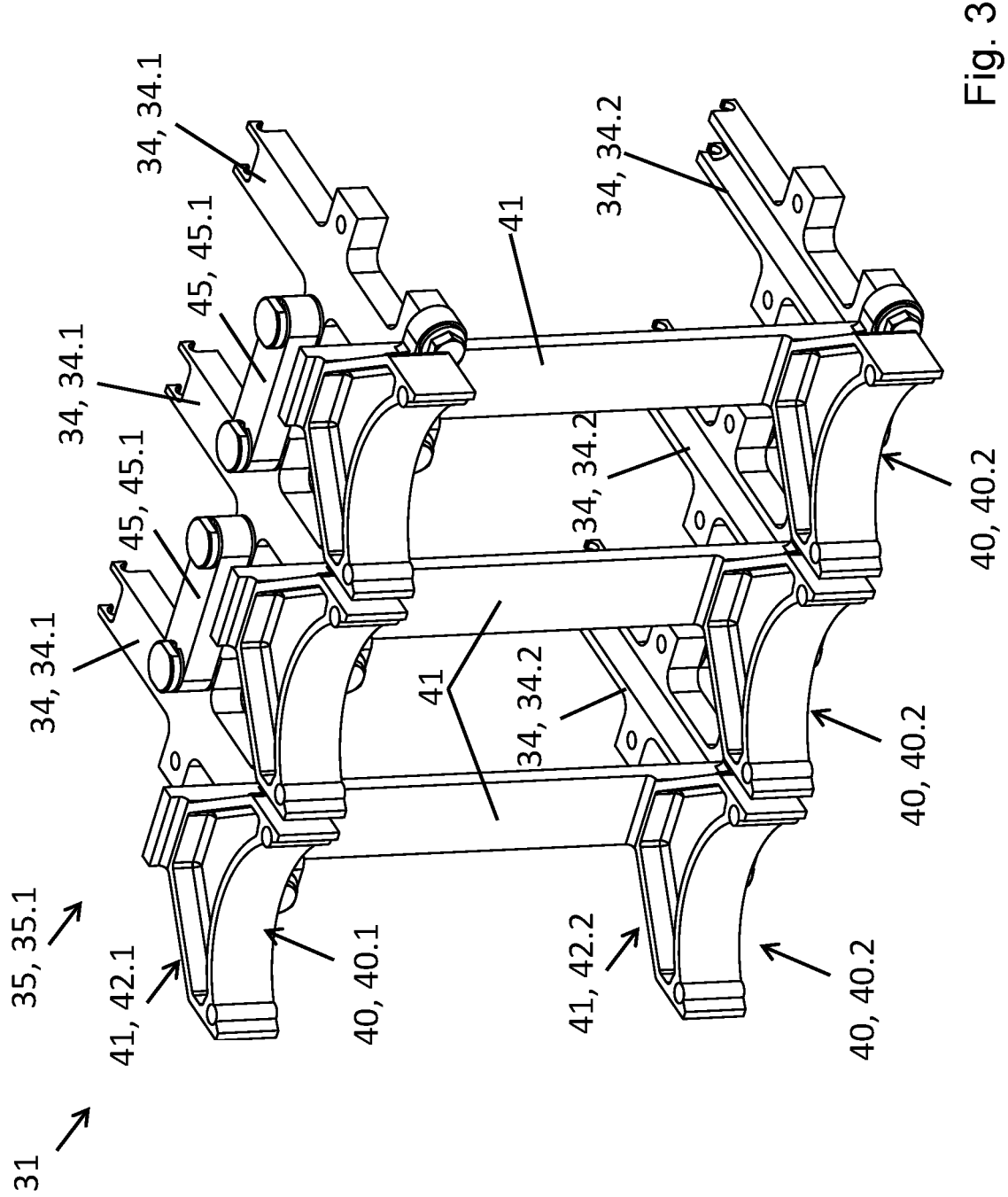
FIG. 3 is a perspective view of a detached format part from a first format group from the device shown in FIG. 2.
Figure 4:
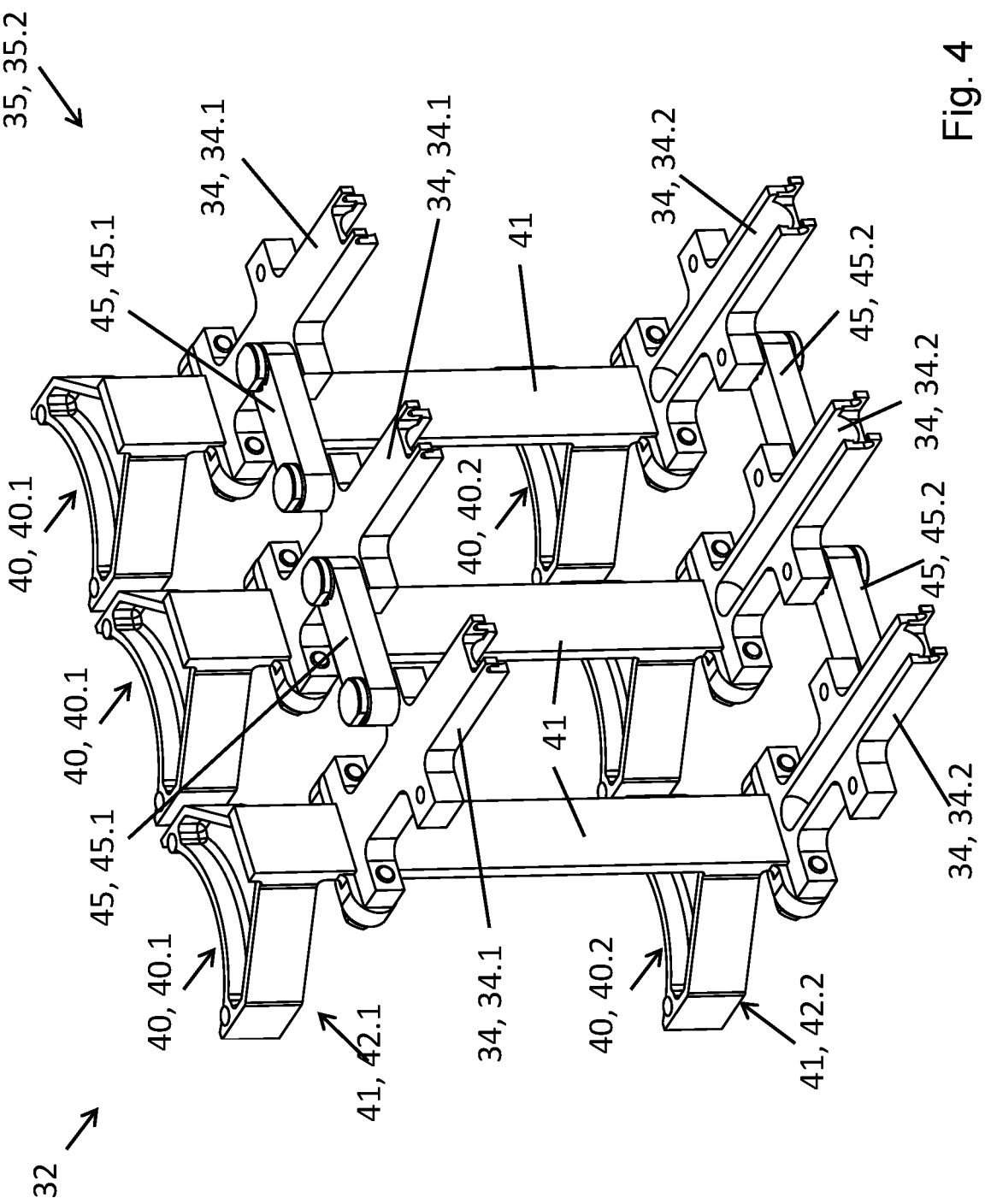
FIG. 4 is a perspective view of a detached format part from a second format group from the device shown in FIG. 2.

Referring now to FIGS. 3 and 4, each of the first and second forming groups 31, 32 comprises as many format parts 35, 35.1, 35.2 as there are containers in the container group 3.1. Each format part 35, 35.1, 35.2 is detachably secured to the corresponding sliding carriage 33.1, 33.2 by a pair of guiding-and-holding elements 34. The pair of guiding-and-holding elements 40 includes first and second guiding-and-holding elements 34.1, 34.2.

Each format part 35, 35.1, 35.2 also forms a contact surface 40, 40.1, 40.2 for engaging a container. Corresponding contact surfaces 40.1, 40.2 on the first and second forming groups 31, 32 are arranged in opposing pairs.

The first and second forming groups 31, 32 are used in connection with separating and/or compressing a container 1 of a container group 3.1. The first and second forming groups 31, 32 move the container group 3.1 along the transport direction A and, when necessary, press the container groups 3.1 against each other along a direction perpendicular to the transport direction A.

Each format part 35, 35.1, 35.2 is an entirely replaceable structural unit that forms a separate module. Upper and lower guiding-and-holding element 34.1, 34.2 mechanically secure their associated format part 35, 35.1, 35.2 to its associated sliding carriage 33.1, 33.2 in such a way that the format part 35, 35.1, 35.2 remains detachable therefrom. Preferably, each of the first and second guiding-and-holding elements 34.1, 34.2 is a bar or a strip with a U-shaped profile.

The upper guiding-and-holding element 34.1 is detachably secured to the upper side limb 37.2 of a corresponding support body 37. The lower guiding-and-holding element 34.2 is detachably secured to the lower side limb 37.2 of its corresponding support body 37. Each guiding-and-holding element 34.1, 34.2 has a free-face side that faces away from the corresponding container-contact surface 40.

A detachable quick-connection device connects a guiding-and-holding element 34.1, 34.2 in the region of its free-face side. Examples of such quick-connection devices include a latch connection and a screw connection. The quick-connection device connects the guiding-and-holding element 34.1, 34.2 to the corresponding support body 37 of a first and/or second sliding carriage 33.1, 33.2, in a mechanically secure but detachable manner.

When in their respective secured states, the upper and/or lower guiding-and-holding elements 34.1, 34.2 contact and form a positive fit at the corresponding upper and/or lower side limbs 37.2, 37.3. As a result, they are aligned relative to their associated first and/or second sliding carriages 33.1, 33.2.

A head piece 41 securely connects the upper and lower guiding-and-holding elements 34.1, 34.2 to one another on the side facing the contact surfaces 40, 40.1, 40.2. The head piece 41 is a strip that is typically made of metal. n a preferred embodiment, the connection is a screw connection.

On the side facing away from the guiding-and-holding elements 34.1, 34.2, the head piece 41 engages a container-receiver pair 42 having upper and lower container receivers 42.1, 42.2 on which are formed a contact-surface pair 40 having corresponding upper and lower container contact surfaces 40.1, 40.2. The upper and lower container contact surfaces 40.1, 40.2 are separated from each other by a vertical distance along a common head piece 41.

The upper and lower contact surfaces 40.1, 40.2 conform to the diameters of the containers that they are intended to engage. In a preferred embodiment, the upper and lower contact surfaces 40.1, 40.2 engage the container over less than half of the container's circumference.

It is possible to change the lengths of the respective upper and/or lower guiding-and-holding elements 34.1, 34.2. This provides a way to conveniently change the distance between the first forming group 31 and the second forming group 32 along a direction transverse to the transport direction A. This, in turn, permits accommodation of different container types, in particular with different diameters. As a result, there is no need to change the guide tracks for the sliding carriages 33, 33.1, 33.2.

FIGS. 3 to 6 show a particular embodiment of a forming device 30 for forming a multipack 3 from two container groups 3.1, each of which has three containers. As a result, each forming group 31, 32 has three format parts 35, 35.1, 35.2 and three sliding carriages 33, 33.1, 33.2.

FIGS. 3 and 4 shows a pair of guide rods 45 comprising upper guide rods 45.1 and a lower guide rods 45.2. The upper guide rods 45.1 couple the upper guiding-and-holding elements 34.1 together and the lower guide rods 45.2 couple the lower guiding-and-holding elements 34.2 together. These guide rods 45 separate the individual format parts 35, 35.1, 35.2 of a forming group 31, 32 from each other. As a result, the upper and lower guide rods 45.1, 45.2 bind the format parts 35, 35.1, 35.2 of a forming group 31, 32 together to form a completely replaceable structural unit.

The lengths of the guide rods 45, 45.1, 45.2 control the distance between the individual format parts 35 of a forming group 31, 32. This length is adjustable. As a result, it is possible to adjust the force that act in and/or against the transport direction A by means of the container contact surfaces 40, 40.1, 40.2 onto the individual containers 1 of a container group 3.1.

In some embodiments, the first and second forming groups 31, 32 have guide rods 45, 45.1, 45.2, with an identical or approximately identical length and identical or approximately identical container contact surfaces 40, 40.1, 40.2.

In other embodiments, the individual format parts 35, 35.1, 35.2 of the first and/or second forming group 31, 32 differ from one another.

Other embodiments feature first and second forming groups 31, 32 that have guide rods 45, 45.1, 45.2 with lengths that differ from each other and with container contact surfaces 40, 40.1, 40.2 that differ from each other.

In some embodiments, the container contact surfaces 40 and/or the respective longitudinal extension of the associated upper and/or lower guiding and holding elements 34.1, 34.2 are adjusted to different container outer casing surfaces of containers 1 of a container group 3.1. This permits formation of a multipack 3 in which containers 1 in the same container group 3.1 have different outer casing surfaces. The adjustment of the respective container contact surfaces 40 and/or the respective longitudinal extension of the associated upper and/or lower guiding and holding elements 34.1, 34.2 take place in this situation in the manner described in greater detail heretofore, to the respective container outer casing surface of the different container types.

In order to form the container groups 3.1, to compress the container groups 3.1, and to produce the multipacks 3, a forming device 30 is provided with a first and second forming group 31, 32, with, for example, in each case three format parts 35 per first and second forming group 31, 32, of which the number of format parts 35 corresponds to the number of containers 1 in a row of the container group 3.1. During the operation of the forming device 30, in the manner described in greater detail hereinafter, the respective format parts 35 of a corresponding forming group 31, 32, which are provided on both sides of the transport section 11, are moved in two closed movement or circulating tracks 14.1 and 14.2 running laterally in relation to the transport section 11, and specifically are also moved on part lengths 14.1.1 and 14.12.1 of the circulating tracks 14.1 and 14.2, running parallel to the transport section 11 and the transport direction A and extending in each case along one side of the transport section 11, specifically in that region in the transport direction A, and in such a way that in each case one first and one second forming group 31, 32, one of which moves on the part length 14.1.1 on one side of the transport section 11, are directly opposite and perpendicular to the transport direction A, and one of which moves on the part length 14.2.1 on the other side of the transport section 11, as represented in FIG. 3. The first and second forming group 31, 32 of a forming device 30, which are therefore provided in pairs on both sides of the transport section 11, move in synchrony and at the same speed.

If the containers 1 are elastically deformable, at least within limits, as is the case with containers 1 made of plastic, then for example at the compressing of the containers 1 with the first and second forming groups 31, 32, opposite one another at the transport section 11, a slight deformation of the containers 1 takes place, inasmuch as this also causes a mutual compressing of the containers 1 adjacent to one another in the respective container group 3.1 in the transport direction A, and the adhesive connection between the containers 1 is also reliably produced in the transport direction A.

At the end of the part length of the transport section 11 which serves to compress the container groups 3.1, the guide curves, not represented in greater detail, for the sliding carriages 33 in turn exhibit such a course that the distance interval of these guide curves from the transport section 11 increases, and, as a result, the containers 1 are released from the corresponding first and second forming groups 31, 32.

For the formation of the container groups 3.1, therefore, the containers 1 delivered via the transport stars 9 are continuously, and preferably still in the region of both transport stars 9, taken up in each case by a container contact surface 40 of a corresponding first and/or second forming group 31, 32, and conveyed with the respective first and/or second forming group 31, 32 in the transport direction A. In this situation, the transport speed of the forming device 30 is preferably slightly greater than the transport speed at which the containers 1 are delivered to the transport section 11, as a result of which the container groups 3.1 are then produced, spaced at a distance from one another in the transport direction A. To compress the container groups 3.1, therefore, in each case a first and a second forming group 31, 32 are arranged on both sides of the transport section 11, opposite one another. At the same time, the format parts 35 of the two forming groups 31, 32 are arranged in pairs and opposite one another in a horizontal axial direction perpendicular to the transport direction A.

In order to avoid an unwanted rotation of the containers 1 at the compressing of the respective container group 3.1, the container contact surfaces 40 can be provided with a friction covering, which produces increased between the respective containers 1 and the associated container contact surface 40.

The invention has been described heretofore by way of exemplary embodiments. It is understood that a large number of modifications or derivations are possible, without thereby departing from the scope of protection of the invention defined by the claims.

The invention claimed is:

1. An apparatus for producing a multipack comprising at least two rows of containers, each of which is formed from a container group, said apparatus comprising a container inlet that receives first and second container flows, a first treatment segment that applies adhesive to containers in said first container flow, a second treatment segment that applies adhesive to containers in said second container flow, and a transport section that is arranged downstream of said first and second treatment segments and that extends along a transport direction, wherein said transport section comprises a forming device that separates container groups from said first and second container flows and compresses said container groups to form said multipack, wherein said forming device comprises first and second forming groups on opposite sides of said transport section and extending along said transport direction, wherein said first forming group comprises a sliding carriage that moves along and transverse to said transport direction, a format part that forms a contact surface for engaging a container, and a guiding-and-holding element that detachably secures said format part to said sliding carriage, wherein said first and second forming groups are movable along said transport direction and transverse to said transport direction such that contact surfaces of said first and second forming groups that are opposite each other are brought into contact with containers to move said containers along said transport direction and to press said containers against each other by moving transverse to said transport direction, and wherein said sliding carriage comprises a U-shaped support body that comprises a middle limb and side limbs that extend at right angles away from a free-face side of said central middle limb, said side limbs comprising an upper side limb, and a lower side limb.

2. The apparatus of claim 1, wherein said guiding-and-holding element is configured as a completely exchangeable structural unit that transitions between a first state and a second state, wherein, in said first state, said guiding-and-holding is detached from said format part, wherein, in said second state, said guiding-and-holding element secures said sliding carriage and said format part to each other, and wherein said guiding-and-holding element is in said first state.

3. The apparatus of claim 1, wherein said guiding-and-holding element comprises a strip having a U-shaped profile.

4. The apparatus of claim 1, wherein said sliding carriage is one of several sliding carriages of said first forming group, wherein said format part is one of several format parts of said first forming group, wherein each of said format parts is detached from said sliding carriages, and wherein each of said format parts is configured to transition between a state of being detached from said sliding carriages and a state of being secured to one of said sliding carriages.

5. The apparatus of claim 1, wherein said first forming group further comprises guide rods that mechanically couple said format part to another format part of said first forming group.

6. The apparatus of claim 1, wherein said format part is one of a plurality of format parts in said first forming group, wherein said first forming group further comprises upper and lower guide rods that that connect said format parts to each other forming an exchangeable structural unit that comprises said guide rods and said format parts, wherein said exchangeable structural unit is detached from said first forming group, wherein said exchangeable structural unit is configured to transition between a state in which said exchangeable structural unit is detached from said first forming group to a state in which said exchangeable structural unit is attached to said first forming group.

7. The apparatus of claim 1, wherein said guiding-and-holding element comprises a rod having a U-shaped profile.

8. An apparatus for producing a multipack comprising at least two rows of containers, each of which is formed from a container group, said apparatus comprising a container inlet that receives first and second container flows, a first treatment segment that applies adhesive to containers in said first container flow, a second treatment segment that applies adhesive to containers in said second container flow, and a transport section that is arranged downstream of said first and second treatment segments and that extends along a transport direction, wherein said transport section comprises a forming device that separates container groups from said first and second container flows and compresses said container groups to form said multipack, wherein said forming device comprises first and second forming groups on opposite sides of said transport section and extending along said transport direction, wherein said first forming group comprises a sliding carriage that moves along and transverse to said transport direction, a format part that forms a contact surface for engaging a container, and a guiding-and-holding element that detachably secures said format part to said sliding carriage, wherein said first and second forming groups are movable along said transport direction and transverse to said transport direction such that contact surfaces of said first and second forming groups that are opposite each other are brought into contact with containers to move said containers along said transport direction and to press said containers against each other by moving transverse to said transport direction, wherein said guiding-and-holding element is an upper guiding-and-holding element, wherein said first forming group further comprises a lower guiding-and-holding element, wherein said sliding carriage comprises a support body, and wherein (1) said support body has upper and lower side limbs,
said upper guiding-and-holding element, which is in a first state in which said upper guiding-and-holding element is detached from said upper side limb, transitions into a second state, in which said upper guiding-and-holding element is secured to said upper side limb, and said lower guiding-and-holding element, which is in a second state, in which said lower guiding-and-holding element is secured to said lower side limb, transitions between a first state, in which said lower guiding-and-holding element is detached from said lower side limb, and said second state, or (2) each of said upper and lower guiding-and-holding elements comprises a free-face side and said first forming group further comprises a detachable quick-connection device that transitions between a first state, in which said quick-connection device is detached from said support body, and a second state, in which said quick-connection device mechanically attaches said support body to corresponding ones of said upper and lower guiding-and-holding elements at said free-face sides thereof.

9. The apparatus of claim 8, wherein said first forming group further comprises a head piece and wherein said head piece comprises a strip that securely connects said upper and lower guiding-and-holding elements to each other.

10. The apparatus of claim 8, wherein said first forming group further comprises a head piece and wherein said first forming group further comprises a container receiver on a side of said head piece that faces away from said guiding-and-holding element.

11. The apparatus of claim 8, wherein said format part comprises upper and lower container receivers that are spaced apart from each other along a head piece and wherein said upper and lower container receivers form corresponding upper and lower contact surfaces for engaging upper and lower portions of a container.

12. The apparatus of claim 8, wherein said support body has upper and lower side limbs, said upper guiding-and-holding element, which is in a first state in which said upper guiding-and-holding element is detached from said upper said limb, transitions into a second state, in which said upper guiding-and-holding element is secured to said upper side limb, and said lower guiding-and-holding element, which is in a second state, in which said lower guiding-and-holding element is secured to said lower side limb, transitions between a first state, in which said lower guiding-and-holding element is detached from said lower side limb, and said second state.

13. The apparatus of claim 8, wherein each of said upper and lower guiding-and-holding elements comprises a free-face side and said first forming group further comprises a detachable quick-connection device that transitions between a first state, in which said quick-connection device is detached from said support body, and a second state, in which said quick-connection device mechanically attaches said support body to corresponding ones of said upper and lower guiding-and-holding elements at said free-face sides thereof.

14. An apparatus for producing a multipack comprising at least two rows of containers, each of which is formed from a container group, said apparatus comprising a container inlet that receives first and second container flows, a first treatment segment that applies adhesive to containers in said first container flow, a second treatment segment that applies adhesive to containers in said second container flow, and a transport section that is arranged downstream of said first and second treatment segments and that extends along a transport direction, wherein said transport section comprises a forming device that separates container groups from said first and second container flows and compresses said container groups to form said multipack, wherein said forming device comprises first and second forming groups on opposite sides of said transport section and extending along said transport direction, wherein said first forming group comprises a sliding carriage that moves along and transverse to said transport direction, a format part that forms a contact surface for engaging a container, and a guiding-and-holding element that detachably secures said format part to said sliding carriage, wherein said first and second forming groups are movable along said transport direction and transverse to said transport direction such that contact surfaces of said first and second forming groups that are opposite each other are brought into contact with containers to move said containers along said transport direction and to press said containers against each other by moving transverse to said transport direction, wherein said guiding-and-holding element is an upper guiding-and-holding element, wherein said first forming group further comprises a lower guiding-and-holding element, and wherein a change in a distance in a longitudinal extension of one of said upper and lower guiding-and-holding elements changes a spacing between said first and second forming groups to accommodate different container types with different diameters.

15. An apparatus for producing a multipack comprising at least two rows of containers, each of which is formed from a container group, said apparatus comprising a container inlet that receives first and second container flows, a first treatment segment that applies adhesive to containers in said first container flow, a second treatment segment that applies adhesive to containers in said second container flow, and a transport section that is arranged downstream of said first and second treatment segments and that extends along a transport direction, wherein said transport section comprises a forming device that separates container groups from said first and second container flows and compresses said container groups to form said multipack, wherein said forming device comprises first and second forming groups on opposite sides of said transport section and extending along said transport direction, wherein said first forming group comprises a sliding carriage that moves along and transverse to said transport direction, a format part that forms a contact surface for engaging a container, and a guiding-and-holding element that detachably secures said format part to said sliding carriage, wherein said first and second forming groups are movable along said transport direction and transverse to said transport direction such that contact surfaces of said first and second forming groups that are opposite each other are brought into contact with containers to move said containers along said transport direction and to press said containers against each other by moving transverse to said transport direction, wherein said first forming group comprises guide rods, wherein said format part is one of several format parts of said first forming group that are connected by said guide rods, and wherein a change of a respective longitudinal extension of at least one of said guide rods causes a change in a lateral distance between format parts of said first and second forming groups and a change in a force between containers of said container groups.

16. The apparatus of claim 15, wherein said guide rods have identical lengths, and wherein said contact surfaces for said first and second forming groups are identical in form.

17. The apparatus of claim 15, wherein said format part is one of plural format parts and wherein said format part is different in structure from at least one other format part in said plural format parts.

18. The apparatus of claim 15, wherein said guide rods are of different lengths, and wherein said format parts are separated from each other by differing distances.

\* \* \* \* \*